United States Patent [19]
Symons

[11] Patent Number: 5,894,655
[45] Date of Patent: Apr. 20, 1999

[54] MONOCOQUE HEAD SUSPENSION AND ITS METHOD OF CONSTRUCTION

[75] Inventor: John B. Symons, Hutchinson, Minn.

[73] Assignee: Hutchinson Technologies, Inc., Hutchinson, Minn.

[21] Appl. No.: 09/005,210

[22] Filed: Jan. 9, 1998

Related U.S. Application Data

[62] Division of application No. 08/775,831, Dec. 31, 1996, Pat. No. 5,734,526.

[51] Int. Cl.⁶ .......................................... G11B 5/42
[52] U.S. Cl. ............................ 29/603.03; 360/104
[58] Field of Search ........................ 29/603.03, 603.04, 29/603.06; 360/104

[56] References Cited

U.S. PATENT DOCUMENTS 5,124,864  6/1992  Matsuzaki ........................ 360/104
5,526,205  6/1996  Aoyagi et al. ..................... 360/104
5,570,261  10/1996  Frater et al. ...................... 360/104

FOREIGN PATENT DOCUMENTS

0 644 530 A1  3/1995  European Pat. Off. .

*Primary Examiner*—Carl E. Hall
*Attorney, Agent, or Firm*—Faegre & Benson, LLP

[57] ABSTRACT

A head suspension for supporting a read/write head adjacent a data storage device has a monocoque construction produced by overlapping laminae having mutually opposed surfaces, with at least one of the surfaces having a cavity etched therein. The monocoque construction of the head suspension constructed according to a method of the invention results in reduced mass of the head suspension and increased rigidity and stiffness.

9 Claims, 6 Drawing Sheets

MONOCOQUE HEAD SUSPENSION AND ITS METHOD OF CONSTRUCTION

This application is a divisional application of Ser. No. 08/775,831 filed Dec. 31, 1996, now U.S. Pat. No. 5,734,526.

BACKGROUND OF THE INVENTION

(1) Field of the Invention

The present invention pertains to a head suspension for supporting a read/write head adjacent a rotating data storage device, and in particular to a monocoque head suspension and its method of construction.

(2) Description of the Related Art

Most personal computer systems today employ direct access storage devices (DASD) or rigid disk drives for data storage. A conventional disk drive contains a spindle that is rotated by an electric motor at several thousand revolutions per minute (RPM) while the disk drive is turned on. A plurality of magnetically coated recording disks are mounted on the spindle for rotation therewith at axially spaced positions along the spindle. The number of the disks and the composition of their magnetic material coating determines the data storage capacity of the disk drive.

Positioned adjacent the peripheries of the rotating disk is a head actuator column. The head actuator column has a plurality of actuator arms thereon, and each actuator arm supports one or more head suspensions that extend in cantilever fashion from the actuator arm to distal ends of the head suspensions. Dynamic storage devices, for example optical or magnetic read/write heads are supported on sliders at the distal ends of each of the head suspensions. The plurality of actuator arms and their associated head suspension support the read/write heads adjacent the top and bottom surfaces of each of the plurality of disks supported by the spindle.

There are basically two types of head actuators, rotary and linear actuators. The rotary actuator moves its head suspensions and their supported read/write heads across the surfaces of the rotating disks in an arc, where the linear actuator moves the head suspensions and their associated read/write heads across the surfaces of the rotating disks linearly. In both types of actuators, the read/write heads supported on the sliders at the distal ends of each of the head suspensions slide in unison on a cushion of flowing air (or flowing liquid in some systems) across the surfaces of the drivers rotating disks. The read/write heads store data received from the disk drive's controller on a selected track of a disk by aligning magnetic particles on the disk surface. The read/write heads retrieve data from a particular track of the disk by detecting the polarities of the magnetic particles that have already been aligned on the disk track.

Continuous improvements made to disk drives have resulted in an increase in the storage capacity of the disk and an increase in the speed of the drive in storing and retrieving data from the disk. As one example, the storage capacity of the disk has been increased by increasing the number of concentric tracks on the surfaces of the disk. Where the size of the disk is limited, increasing the storage capacity of a disk results in increasing the density of the tracks on the surface of the disk as well as increasing the density of information stored on each track. The increased data density on the disk permits increased data storage while maintaining and possibly reducing the size of the disk. However, the increased density of tracks on the disk requires that the read/write head be more closely controlled to prevent lateral off-track error. The increased density of data on each track requires that the read/write head fly closer to the disk. As the transducer head is moved closer to the surface of the rotating disk, it creates an increased danger of the transducer head contacting the surface of the disk, resulting in the friction created by the rotating disk contacting the head damaging the surface of the disk, and potentially effecting the data stored on the disk as well as potentially damaging the head itself.

It is a complicated problem to design a head suspension that can cantilever a transducer head from an actuator arm at a substantially constant position relative to a rotating disk surface with there being an extremely small clearance between the head and the rotating disk surface, with the clearance sometimes being only 0.1 micrometers (a human hair is 100 micrometers thick). The surface of a data storage disk is not perfectly flat. When rotating in the disk drive, the contours of the disk surface create disruptions in the air stream created above the rotating disk surface on which the transducer head glides or flies. When the head is flying over a single track of the disk to access information on that track, it must glide at its predetermined slider attitude relative to the disk's contours. With the disk rotating at a constant speed, the surface velocity of the disk and the velocity of the air stream created by its rotation increases as the transducer head supported by the head suspension is moved from the center of the disk toward the disk periphery. As the head suspension moves the transducer head between the center and periphery of the rotating disk, it must have sufficient rigidity to resist changes in the lift forces created by the changes in the velocity of the rotating disk air stream and by the differences in the surface contours of the disk to hold the head at a desired clearance over the surface of the rotating disk.

In addition to the varying lift forces exerted on the head suspension, the head suspension is also subjected to extreme stresses as the actuator arm moves the head suspension and its supported transducer head quickly from one concentric track of data to another. The head suspension must be sufficiently rigid to withstand the stresses caused by this rapid movement without deflecting appreciably. The head suspension must also resist vibration after its rapid movement which could cause the transducer head to miss or overshoot the intended track of data among the densely arranged concentric tracks. Also, while being moved, the head suspension must not twist due to torque exerted on the suspension. This can cause one edge of the slider to be positioned closer to the rotating disk surface than an opposite edge of the slider resulting in off-track error or the head missing the desired track of data to be accessed among the densely arranged tracks. Also, an increased number of tracks on the disk increases the potential for lateral off-track error if torsional twisting of the head suspension reaches its torsional resonance frequency In operation, forces exerted on a head suspension will cause it to twist in torsion about the center longitudinal axis of the load beam. The twisting causes the slider and read/write head supported by the load beam to swing or pivot through a curve laterally from side to side. Depending on how far the read/write head is spaced from the center axis of the load beam, the swinging motion of the slider is more pronounced and the gain of the torsional frequency is increased. This side to side motion can cause the read/write head attached to the slider to swing or pivot off the disk track it is desired to access, resulting in a lateral off-tracking error. To combat this problem requires increasing the torsional stiffness of the head suspension without appreciably increasing the mass of the head suspension, thereby increasing the head suspension's torsional resonance frequency.

Competing with the need for rigidity in the head suspension is the need to give the head suspension as low a mass as possible to reduce inertial momentum of the assembly created by its rapid positioning movements. A large mass can detrimentally affect the quick movement of the head suspension and can create overshoot of a head suspension.

It is also a practical consideration that the head suspension construction facilitate the placement of electrical conductors carrying the electrical signals to and from the transducer head. It is desirable that the head suspension permit these conductors to be attached to the assembly in a manner that reduces their movement and vibration as the head suspension is moved, which can cause fluctuating input and output impedances.

Applying a known principle that the stiffness of a head suspension increases in proportion to the third power of its thickness, common methods for increasing the rigidity of a head suspension have included bonding additional layers of stiffening materials to areas of the load beam of the head suspension where rigidity is required, or forming bent sidewalls or rails that extend longitudinally along the opposite lateral edges of the head suspension load beam where additional rigidity is needed. The drawback of each of these prior art methods is that they result in adding significantly to the overall mass of the head suspension.

The desire to increase the rigidity of head suspensions without appreciably increasing their mass has resulted in the box beam design of head suspensions such as that disclosed in copending application Ser. No. 08/723,510, filed Sep. 30, 1996, which is a continuation of application Ser. No. 08/216,494, filed Mar. 22, 1994, now abandoned, the former of which is assigned to the assignee of record and incorporated herein by reference. In this type of box beam design the load beam is layered with a stiffener where the stiffener has an interior area between opposite lateral flanges of the stiffener, the interior area having been stamped to displace the area relative to the opposite lateral flanges or to give the interior area a concave shape. When the stiffener is attached to the load beam along its opposite lateral flanges, a box section or interior chamber is interposed between the load beam and stiffener. In a variation of this construction, the load beam itself is stamped forming it with an interior area that is displaced from opposite lateral flanges of the load beam. Connecting a flexure to the load beam along its opposite lateral flanges forms the box section or interior chamber. However, these methods of manufacturing head suspensions are disadvantaged in that they require welding the load beam to a stiffener or flexure along the opposite lateral edges outside the stamped areas of the load beam or stiffener. This requires extra material to provide the flanges for the welds (and its associated mass) to be added to the head suspension and located at a large distance from the longitudinal axis of the load beam. This extra material and its mass adds very little additional torsional stiffness to the head suspension because it is flat, but contributes significantly to the longitudinal polar moment of inertia. These effects combine to lower the torsional resonance frequency of a head suspension manufactured in this manner.

It is therefore desirable to design a head suspension constructed in a manner that increases its torsional stiffness without appreciably increasing its mass, thereby increasing the torsional resonance frequency of the head suspension.

SUMMARY OF THE INVENTION

The present invention is directed to a head suspension that cantilevers a read/write magnetic transducer head adjacent the rotating surface of a disk in a disk drive from an actuator arm of the disk drive, and the method of constructing the head suspension. The head suspension is disclosed in variant embodiments, all having a monocoque construction. The monocoque construction provides the head suspension with increased rigidity and stiffness along the intermediate longitudinal length of the assembly where it is most needed to resist torsional twisting, while still providing resiliency at its proximal end where it attaches to the actuator arm and a gimballing region at its distal end where it supports the transducer head adjacent the rotating disk. The monocoque construction provides the increased rigidity and stiffness without appreciably increasing the mass of the head suspension or its overall thickness. The construction also requires a minimal amount of manufacturing steps reducing the expense of manufacturing, and provides flat uninterrupted surfaces between the head suspension distal end and its spring region facilitating the placement of electrical conductors across the surfaces.

One embodiment of the head suspension includes a load beam having a longitudinal length between its opposite proximal and distal ends. Adjacent the load beam proximal end, a portion of the load beam is configured for attachment to an actuator arm, as is conventional. A spring region is formed adjacent to this proximal portion of the load beam. The load beam has opposite interior and exterior surfaces extending longitudinally from the spring region to its distal end. One or more cavities is etched into the thickness of the load beam from its interior surface. A flexure is secured to the load beam interior surface overlying and enclosing the interior volume of the cavity. The flexure has opposite proximal and distal ends with the proximal end of the flexure being positioned adjacent the load beam spring region and the distal end of the flexure having a gimbal design provided adjacent thereto. The gimbal supports a slider that in turn supports a transducer head. The load beam and the flexure serve as two laminae of a laminate construction of the head suspension that produces a monocoque structure. The material etched from the load beam interior surface producing the monocoque construction of the head suspension reduces the mass of the assembly while the monocoque construction provides the assembly with increased torsional rigidity and stiffness.

In a further embodiment, the load beam is constructed of a sheet of stainless steel that is thinner than that employed in constructing the load beam of the previous embodiment. This enables a gimballing region to be provided adjacent the distal end of the load beam. To achieve the needed stiffness and rigidity in the head suspension along the longitudinal length of the load beam from its spring region to its distal end, a separate stiffener is attached to the interior surface of the load beam. The stiffener is formed with opposite interior and exterior surfaces, and with one or more cavities etched into the thickness of the stiffener from its interior surface. Attachment of the stiffener interior surface to the load beam interior surface encloses the volumes of the cavities within the head suspension formed. The material etched from the cavities in the stiffener reduces the overall mass of the head suspension, and the monocoque structure of the assembly provides it with its needed torsional rigidity and stiffness.

In a still further embodiment of the head suspension, this last described embodiment is provided with cavities formed into the interior surface of the load beam that oppose the cavities formed into the interior surface of the stiffener, thereby further reducing the mass of the head suspension. In addition, the opposite lateral edges of the beam and the stiffener along the intermediate length of the head suspension between the spring region and gimbal region are given curved edges. This further increases the shock and torsional resonance performance of the monocoque structure head suspensions.

In each embodiment the opposite surfaces of the load beam and the flexure or stiffener enable the placement of electrical conductors across any one of these surfaces and also enable the placement of the conductors between the attached interior surfaces. This improves the shielding of the conductors from electromagnetic noise inside the hard drive and also reduces the possibility of damage to the conductors during handling of the head suspension.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

The head suspension of the invention is described by referring to three variant embodiments of the invention. Each head suspension embodiment is basically a laminate constructed of two laminae. In each embodiment, the load beam serves as one of the lamina, and either a flexure or a stiffener serves as the other lamina. In each of the embodiments, the laminae have mutually opposed interior surfaces and one or more cavities formed into one or more of the interior surfaces prior to the attachment of the laminae together and the enclosure of the cavity between the attached laminae. Also, unetched areas may be left within the etched cavities forming weld islands in the cavities, or unetched areas having a lattice or crisscrossed pattern may be left between etched cavities to provide stabilization and increased torsional stiffness and/or weld areas in the opposed interior surfaces. In this way, each embodiment of the head suspension is formed as a monocoque (i.e. hollow) structure.

Monocoque construction is typically associated with the construction of aircraft or rockets. It is a method of construction in which the stressed outer skin of the aircraft or rocket carries all or a major portion of the torsional or bending stresses. Applying this principle to transducer head suspensions results in a stiffer and lighter head suspension with higher shock and torsional resonance performance than currently available in prior art head suspension constructions of the same mass. The construction of the monocoque head suspension of the invention according to the method of the invention is more efficient than prior art methods of manufacture and enables the construction of load beams with no limitations on the shapes of their lateral edges. This enables the head suspension to be constructed with second-order, non-linear curved edges that are much better than straight edges in increasing the torsional resonance of the head suspension.

Figure 1:
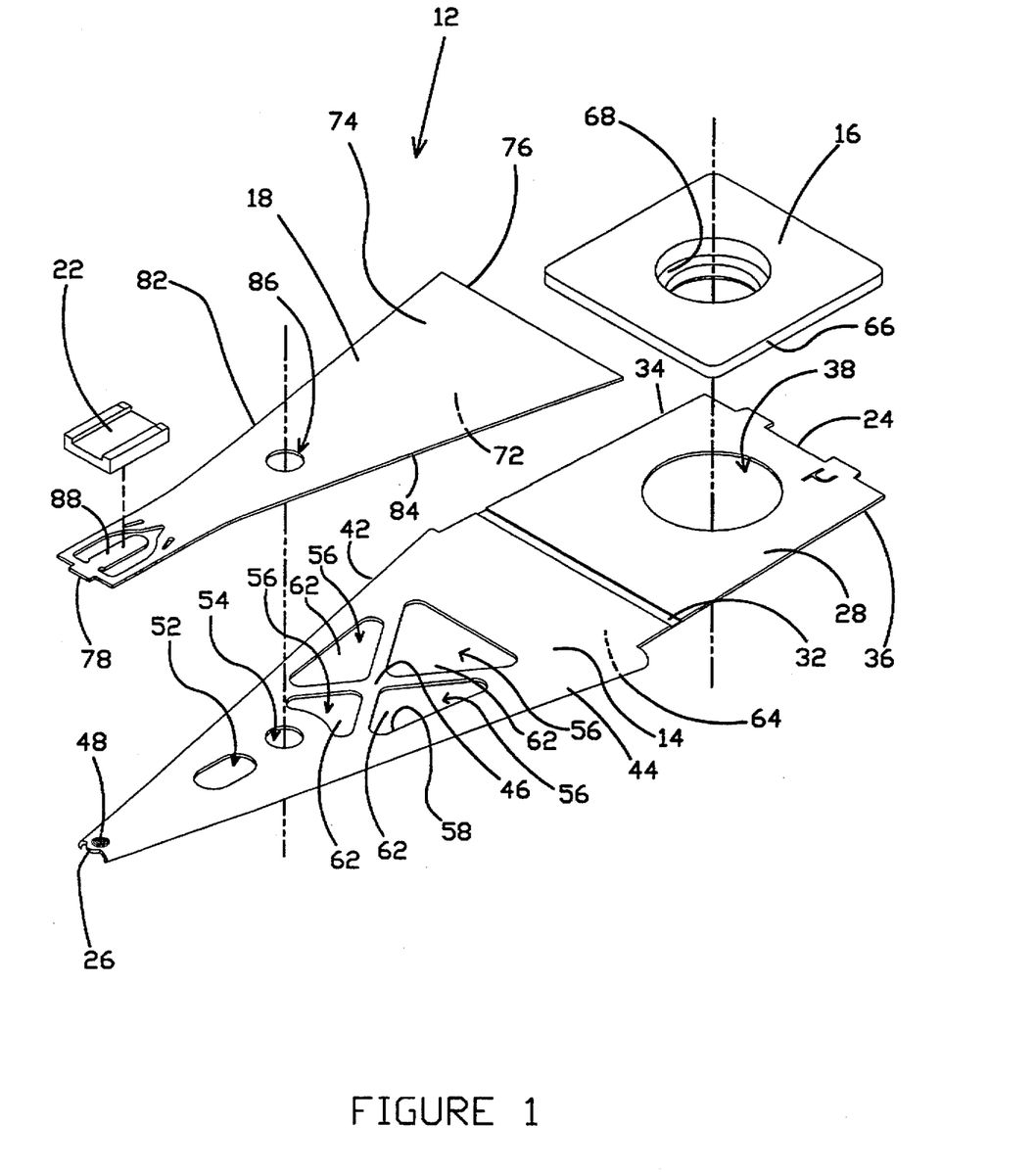
FIG. 1 is an exploded isometric view of a first embodiment of the head suspension of the invention.

FIG. 1 shows an exploded perspective view of a first embodiment of the transducer head suspension 12 of the present invention constructed according to the method of the invention. The head suspension is basically comprised of a load beam 14, a beam support base 16, a flexure 18, and a slider 22. In the construction of FIG. 1, the load beam 14 and flexure 18 make up the two laminae that together produce the laminate construction of the head suspension.

The load beam 14 has a longitudinal length with opposite-proximal 24 and distal 26 ends and is constructed of stainless steel or other conventionally used materials. A portion of the load beam adjacent its proximal end 24 is formed with a support region 28 and an adjacent spring region 32. Although a partial etched trough 32 is shown in the spring region, other known methods of reducing the load beam spring rate in the spring region may be employed such as full thickness or partial thickness windows. The support and spring regions of the load beam have opposite lateral edges 34, 36 that extend substantially parallel to each other. An aperture 38 is formed in the support region 28 of the load beam for attachment of the beam support base 16 to the load beam and attachment of the head suspension to an actuator arm (not shown), as is conventional. In some applications of the head suspension, the base plate 16 may not be needed. The opposite lateral edges of the load beam that extend longitudinally from the spring region 32 to the distal end 26 of the load beam are formed in a pair of bent rails 42, 44. The rails in this illustrative embodiment taper toward each other as they extend from the load beam spring region 32 toward the load beam distal end 26. The load beam has an interior surface 46 bounded by the spring region 32, the pair of rails 42, 44 and the beam distal end 26. The interior surface 46 extends uninterrupted from the spring region 32 to the beam distal end 26 except for a dimple 48 formed in the surface, a mass reducing aperture 52 and a pilot or tooling aperture 54, and a plurality of recessed cavities 56 formed in the interior surface of the beam The dimple 48 and apertures 52, 54 are conventional However, the cavities 56 are formed into the interior surface of the load beam to remove material and thus reduce the mass of the load beam while also forming a part of the monocoque construction of the head suspension constructed according to the method of the invention to be explained.

In the preferred embodiment of the invention and according to the preferred method of the invention, the cavities 56 are formed in the load beam interior surface 46 by partial etching, although other known methods of forming a cavity in a beam surface may be employed. As an illustrating example, in the embodiment of FIG. 1, the load beam 14 is about 0.1 mm thick. The cavities 56 are photolithographically etched into the load beam from its interior surface 46 to a depth of about 0.07 mm, forming a cavity side wall 58 and a cavity recessed surface 62 for each cavity 56. The etching process leaves a remaining material thickness between the cavity recessed surface 62 and the exterior head suspension surface 64 on the opposite side of the load beam as viewed in FIG. 1 of 0.03 mm. It should be understood that these dimensions are illustrative only, and should not be interpreted as limiting.

The process of photolithographically partially etching is known in the art. Generally, the sheet of stainless steel from which the load beam 14 is constructed is coated on both sides with a photoresist. The photoresist on both sides of the sheet is then exposed with a stencil pattern of the desired final shape of the load beam. During this exposure step, only the interior surface 46 of the load beam in which the cavities are to be formed is exposed with the pattern of the cavities 56. Following development of the exposed sections of the photoresist, both sides of the sheet are then subjected to acid for a sufficient period of time to permit the acid to dissolve away or etch a sufficient amount of the sheet material from each side to define the outline of the load beam. This results in the material surrounding the peripheral edges of the load beam being removed from the sheet with the load beam having its desired peripheral configuration and mass reduction, tooling and support region apertures, and with the cavities 56 formed in the interior surface of the load beam. By adjusting the amount of time the stainless steel in the regions where the cavities are to be formed is exposed to the acid, the depth of the cavities 56 may be adjusted. It should also be apparent that the configuration of the cavities and the number of cavities, as well as forming a cavity in the load beam or the flexure interior surfaces to produce the monocoque structure of the head suspension may all be changed according to the method of the invention as will be explained in discussing later embodiments of the invention. Also, the cavities may be formed in the load beam interior surface 46 leaving islands of unetched material within the cavities or leaving other internal support structures of unetched material such as the X-shaped crossbrace left unetched in FIG. 1. The crossbraces provide stabilization and increased torsional stiffness to the monocoque head suspension and, together with the unetched islands, provided areas for spot welds between the opposed interior surfaces of the load beam and flexure or stiffener. It is also preferable that the cavity sidewalls be formed with rounded corners as opposed to angled corners. This contributes to the increased torsional resonance of the head suspension.

With the cavity etched load beam constructed according to the method just described, the exterior surface 64 of the load beam opposite the interior surface 46 having the cavities 56 formed therein may be a flat surface extending from the beam distal end 26 longitudinally to the spring region 32 of the beam. This flat exterior surface of the beam is not interrupted by the formation of the cavities 56 and extends completely over the cavities.

The construction of the load beam support base 16 is for the most part conventional and is not needed in all applications of the head suspension of the invention, therefore it will not be discussed in detail. Basically, the support base 16 has a periphery 66 typically configured to correspond to the configuration of the load beam proximal end 24 and the portions of the load beam lateral edges 34, 36 on the opposite sides of the beam support region 28, all of which are typically configured to enable attachment of the proximal end of the head suspension to an actuator arm (not shown). The support base is typically welded to the load beam and the center of the support base 16 is provided with a swage base 68 that is inserted through the support region aperture 38 and used to connect the support base 16 to an actuator arm (not shown). Other methods of attaching the support base 16 to the load beam 14 known in the art may be employed.

Figure 2:
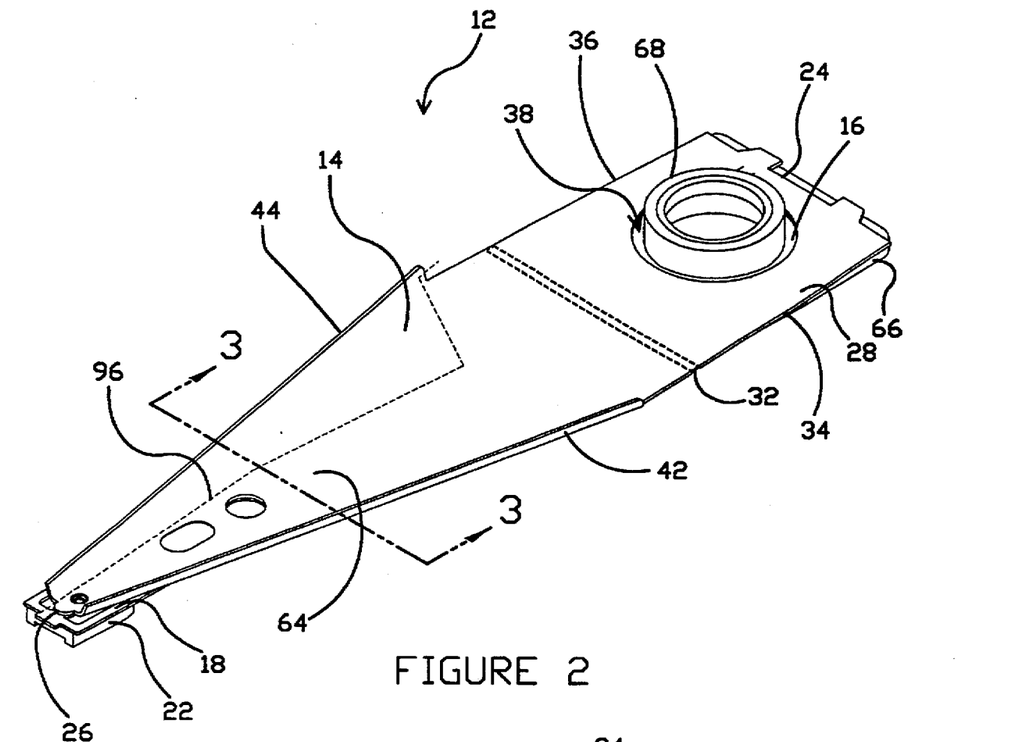
FIG. 2 is an isometric view of the assembled head suspension of FIG. 1.
Figure 3:
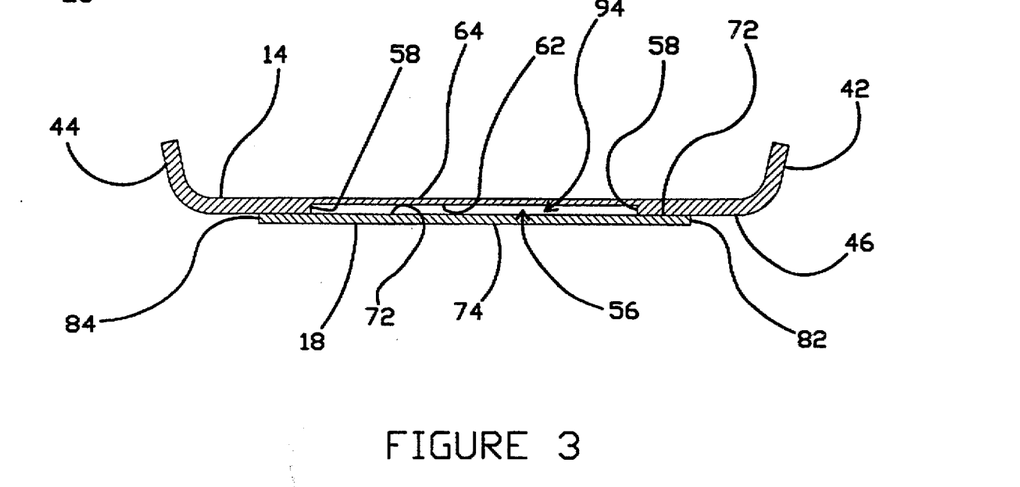
FIG. 3 is a cross-sectional view of the head suspension in a plane extending along the line 3—3 of FIG. 2.

The flexure 18 serves as the other lamina of the head suspension laminate construction. In the embodiment of FIGS. 1–3, the flexure 18 can be any conventional flexure having interior 72 and exterior 74 surfaces extending longitudinally between its proximal end 76 and distal end 78, the interior surface being sufficiently large to extend over the load beam cavities 56. The flexure has a thickness of 0.03 mm, although this dimension can vary and is used herein as an illustrative example. The flexure is constructed of stainless steel or other conventionally used materials in flexures, and has a longitudinal length between its proximal and distal ends that enables it to extend from the load beam spring region 32 at its proximal end to just beyond the load beam distal end 26 at the flexure distal end 78. The flexure has lateral edges 82, 84 that generally follow the lateral edges formed by the load beam rails 42, 44 but are positioned within the rails when the flexure is attached to the load beam interior surface 46. A tooling aperture 86 is formed through the flexure and is used in properly positioning the flexure relative to the load beam interior surface 46 when attaching the flexure to the load beam, as is conventional. The flexure is shown with a tongue 88 formed in a distal portion of the flexure adjacent its distal end 78. The slider 22 that holds the read/write head is attached to the flexure tongue 88 by adhesives or by other known methods. The tongue 88 gimbals about the load beam dimple 48 when the flexure is attached to the load beam and thereby gimbals the read/write head. The configuration of the tongue 88 shown in the drawings is illustrative only and should not be interpreted as limiting. It is intended that the flexure employed with this embodiment of the invention be adaptable to use any type of known gimbal design or method for gimballing the read/write head held by the flexure tongue.

FIGS. 2 and 3 show the load beam 14, beam support base 16, flexure 18 and slider 22 assembled together in the head suspension of the invention. When assembled, the load beam interior surface 46 is secured to the flexure interior surface 72 completely enclosing the load beam cavities 56 and thereby forming the monocoque construction of the head suspension. The flexure and load beam interior surfaces may be secured together by spot welds, as is conventional, or by adhesives or by any other equivalent method. Employing structural adhesives to connect the flexure and load beam as opposed to welding provides the benefit of a more efficient structure because at any cross-section of the enclosed cavity the box structure is completely enclosed, whereas when spot welds are used to join these laminae, the cavity is only enclosed at the weld points. Cross-sections inbetween spot welds are not completely enclosed because there is no attachment of the laminae between the spot welds. As shown in FIG. 3, the monocoque construction of the head suspension results in the head suspension having a completely enclosed hollow interior volume 94 interposed between the exterior surface 74 of the flexure and the exterior surface 64 of the load beam. These two exterior surfaces of the flexure and load beam extend longitudinally from the distal ends of the flexure 78 and load beam 26 to the flexure proximal end 76 and the load beam spring region 32, respectively. Either of these surfaces provide an optimum environment for the use of electrical conductors etched along the surfaces and communicating with the transducer head. In addition, the interior surface of the lamina permit the routing of the conductors between the two laminae as represented by the dashed line 96 in FIG. 2. Various types of known conductors may be employed. These include printed circuit conductors, flex circuit conductors, or other conductors formed directly on the head suspension lamina by known methods such as vapor deposition or photolithography.

The structural efficiency of the monocoque head suspension construction is dependent on the thickness of the flexure, the depth of the partial etched cavities, the shape of the flexure, the shape of the partial etched cavities, the thickness of the load beam material, and the method in which the flexure is attached to the load beam. In the illustrative example given, the head suspension uses a 0.1 mm thick load beam, a 0.03 mm thick flexure, and a partial etched depth of 0.07 mm. These dimensions provide a total head suspension thickness of only 0.13 mm which is well suited for very tight disk spacing requirements.

In constructing the head suspension with the monocoque structure described above, the advantages of higher shock and torsional resonance performance associated with the monocoque construction are achieved without appreciably increasing the thickness and/or mass of the head suspension. Because the head suspension is basically comprised of two lamina, its construction is more efficient than the construction of prior art head suspensions that have stamped recesses or several reinforcing folds in their load beams, resulting in a reduction in manufacturing expenses.

Figure 4:
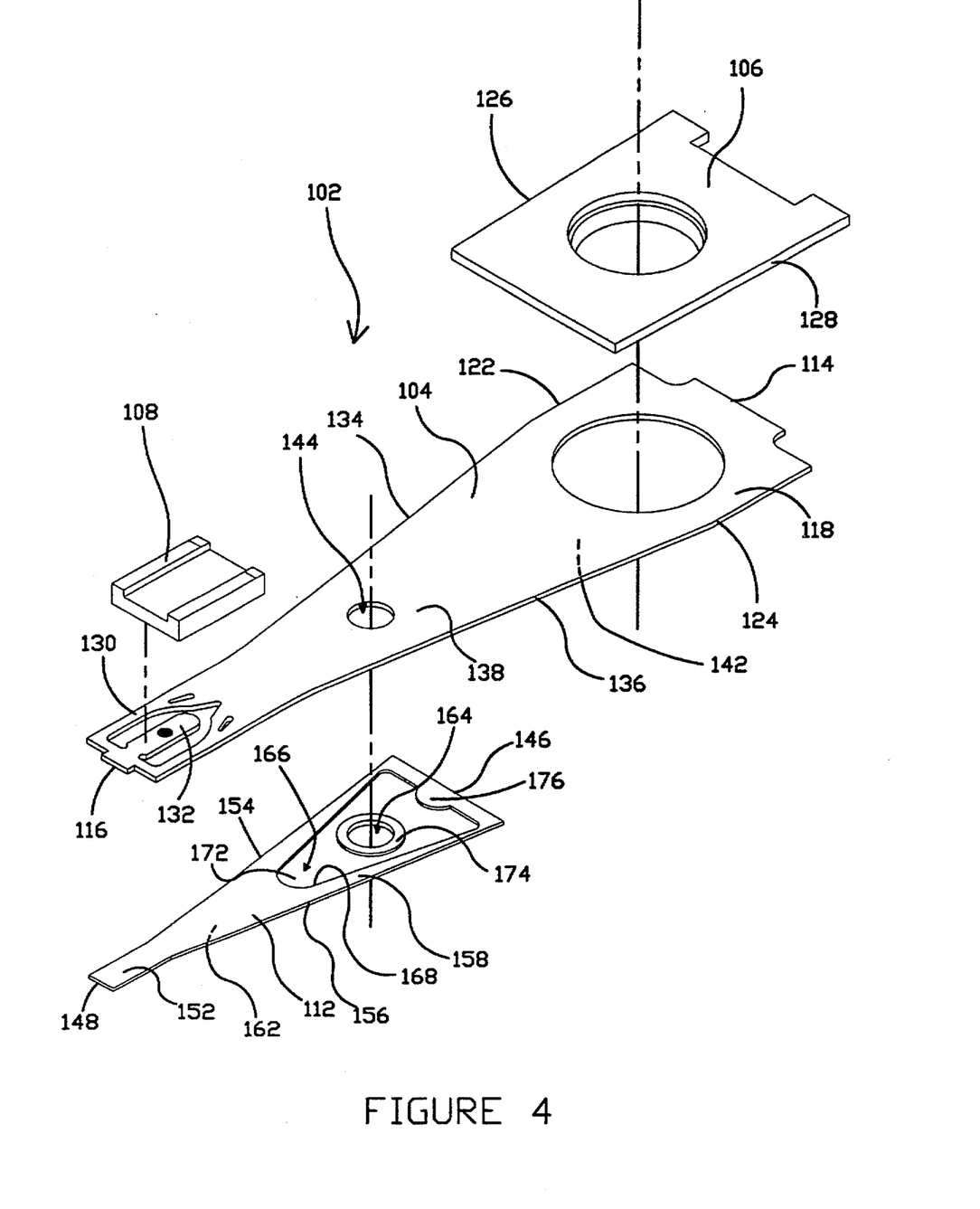
FIG. 4 is an exploded isometric view of a further embodiment of the head suspension of the invention.
Figure 5:
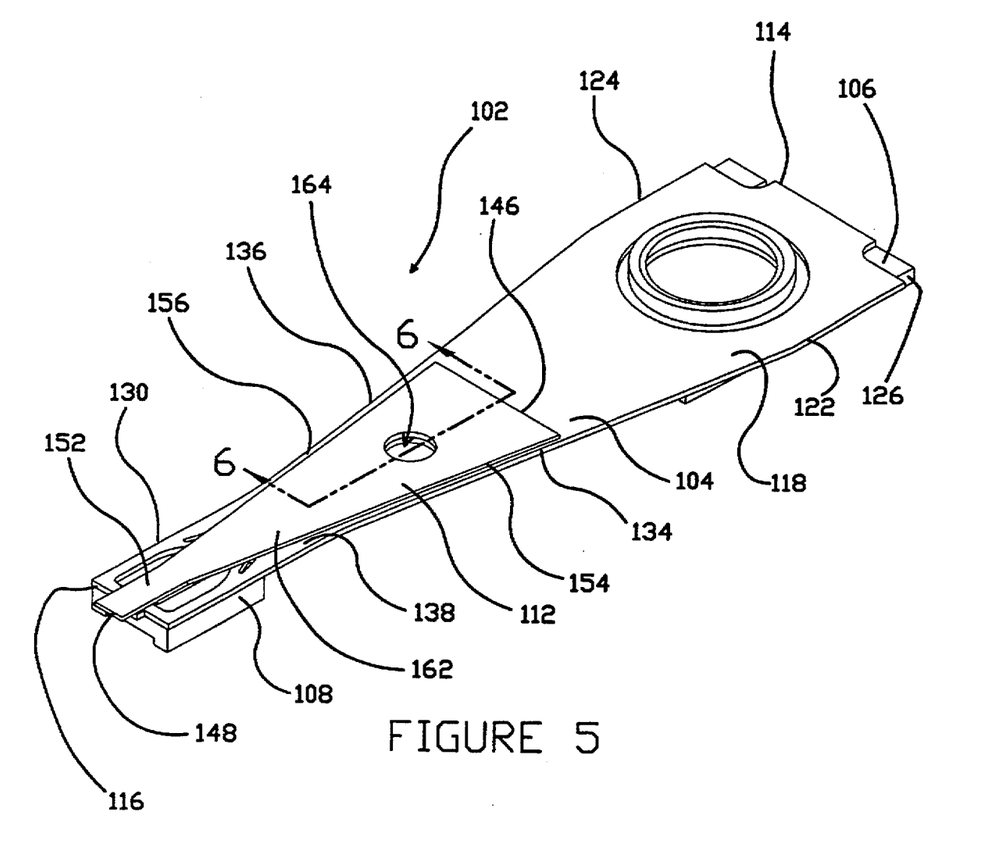
FIG. 5 is an isometric view of the assembled head suspension of FIG. 4.
Figure 6:
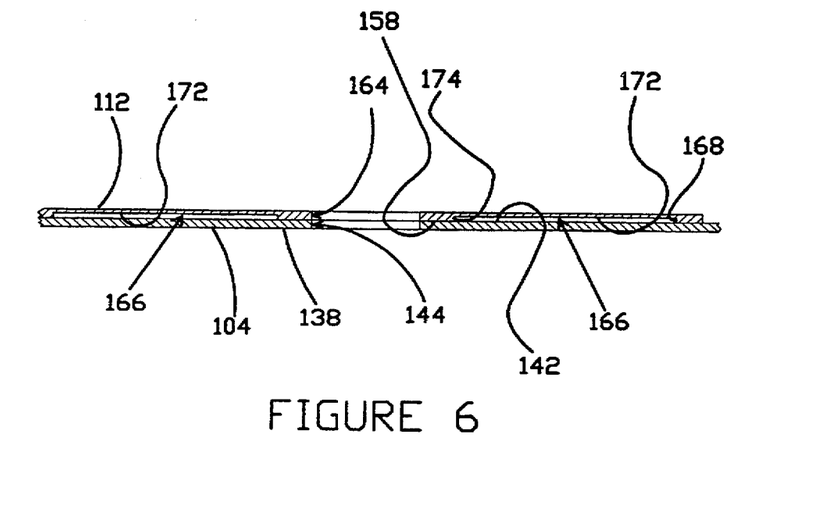
FIG. 6 is a partial cross-sectional view of the head suspension of FIG. 5 in a plane extending along the line 6—6 of FIG. 5.

FIGS. 4–6 show a further embodiment of the head suspension of the invention similar to that of FIGS. 1–3. Because its construction is similar to the previously described embodiment, it will not be described in as much detail as the previous embodiment The head suspension 102 of FIGS. 4–6 also includes a load beam 104, a support base 106 and a slider 108. However, the load beam in this embodiment is constructed from a sheet of stainless steel having a lesser thickness than that of the previously described embodiment, for example 0.025 mm thick. This lowers the spring rate of the spring region in the load beam However, to reinforce the longitudinal length of the load beam that cantilevers the slider 108 and the transducer head, a stiffener lamina 112 is provided in the head suspension construction. The stiffener has an increased thickness from a typical flexure, for example 0.075 mm. Therefore, the load beam 104 and stiffener 112 comprise the two laminae of the head suspension's laminate construction.

The load beam has a longitudinal length with a proximal end 114 and opposite distal end 116. The load beam has a support region 118 adjacent its proximal end 114. The support region has opposite lateral edge portions 122, 124 typically configured and dimensioned to coincide with the opposite lateral edges 126, 128 of the load beam support base 106. The support base 106 is attached to the load beam just as in the previous embodiment. Because the load beam is constructed of a thinner sheet of material, it has more flexibility, enabling a gimbal region 130 to be formed adjacent the beam distal end 116O The gimbal region has a tongue 132 that supports the slider 108 on one side and has a dimple on its opposite side that engages the stiffener. Just as in the previous embodiment, the shown gimbal region is illustrative only and could be shaped differently to make use of other gimbal designs on the load beam.

As the load beam 104 extends longitudinally from its support region 118 to the gimbal region 130, portions of its opposite lateral edges 134, 136 typically taper linearly toward each other. Note that the lateral edges 134, 136 do not have bent rails for added rigidity as in the previous embodiment. Rails may not be necessary due to the reinforcement provided by the stiffener. A pilot or tooling aperture 144 passes through the load beam.

The stiffener lamina 112 has opposite proximal 146 and distal 148 ends and a longitudinal length therebetween that is significantly shorter than that of the load beam as shown in FIG. 5. When attached to the load beam, the stiffener proximal end 146 is spaced longitudinally from the support base 106 with the length of the load beam between the support base and the stiffener functioning as the spring region of the head suspension. The stiffener may be attached to the load beam by welds or by other methods such as adhesives. A distal region 152 of the stiffener adjacent its distal end 148 typically has a general rectangular configuration and projects adjacent the gimbal region 130 of the load beam engaging the tongue dimple. As the stiffener extends from its proximal end 146 to this distal region 152, its opposite lateral edges 154, 156 typically follow the lateral edges 134, 136 of the load beam 104. As best seen in FIG. 5 the lateral dimension between the stiffener lateral edges 154, 156 is determined to position those edges just inside the opposite lateral edges 134, 136 of the load beam. The stiffener has opposite interior 158 and exterior 162 surfaces. A pilot or tooling hole 164 passes through the stiffener and its position corresponds to the position of the load beam pilot hole 144 to properly position the stiffener relative to the load beam.

A single cavity 166 is etched into the stiffener interior surface 158 in the same manner as that described in the previous embodiment. The cavity 166 is defined by its sidewall 168 that extends inwardly into the stiffener from its interior surface 158 to the cavity recessed surface 172. Within the cavity, an area of the stiffener interior surface 158 surrounding the pilot hole 164 is left unetched and forms an island 174 or isolated projection within the cavity. This island 174 or projection within the cavity forms an isolated surface along the center longitudinal axes of both the load beam and the stiffener where spot welds or other equivalent means could be used in attaching the stiffener interior surface 158 to the load beam interior surface 142. Also note that forming the cavity 166 by partial etching enables leaving additional areas of unetched material within the cavity 166 or projecting from the cavity sidewall 168, such as the projection 176, for the placement of additional spot welds where needed. Additional spot welds, adhesives, or other equivalent methods of attachment can be used in the area of the load beam 104 interior surface 158 surrounding the cavity in attaching the stiffener interior surface to the load beam interior surface as shown in FIGS. 5 and 6. Furthermore, additional projections could be positioned in the cavities symmetric with the center longitudinal axis of the head suspension to provide additional attachment points in the cavities.

Figure 7:
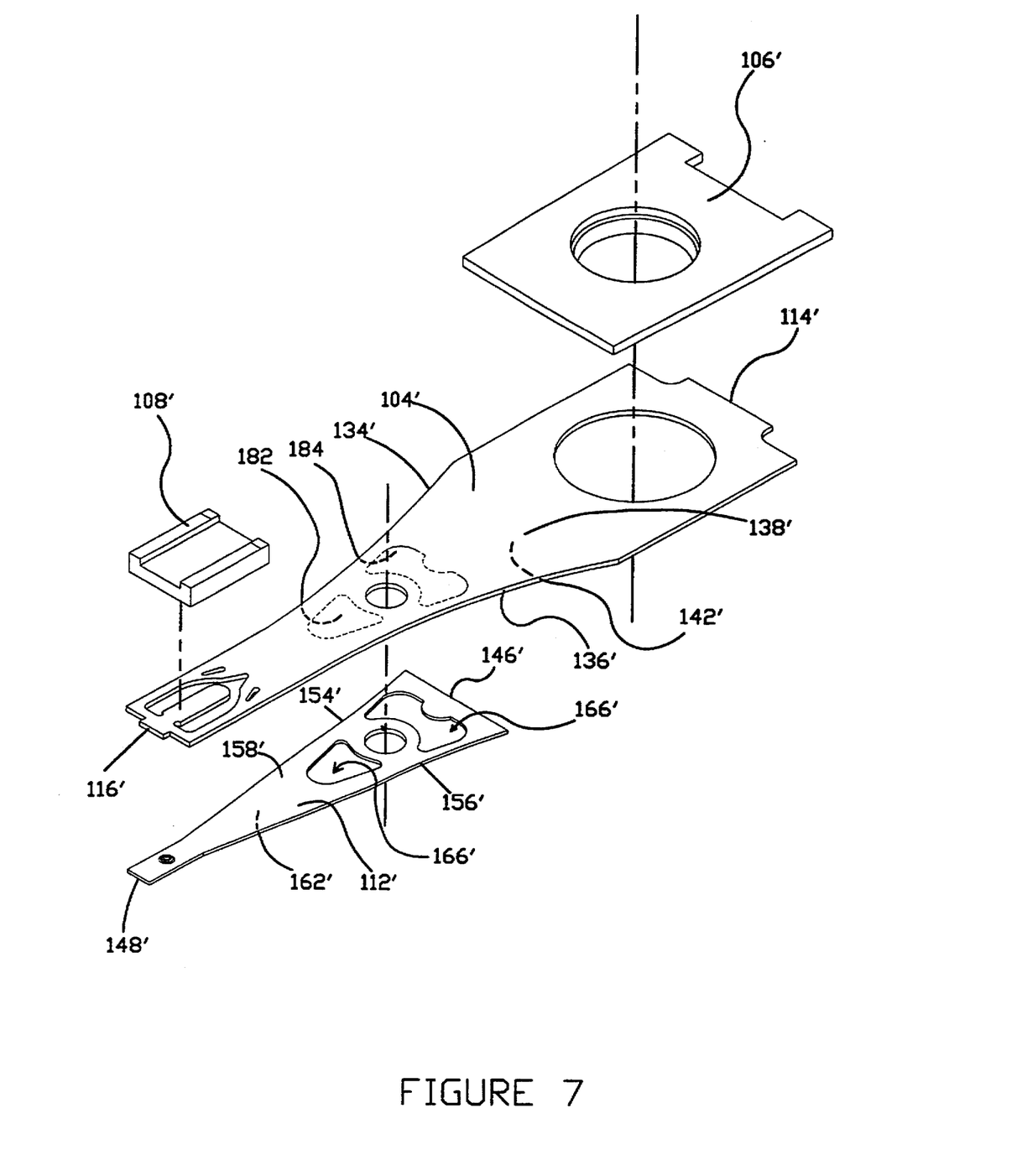
FIG. 7 is an exploded isometric view of a still further embodiment of the head suspension of the invention.
Figure 8:
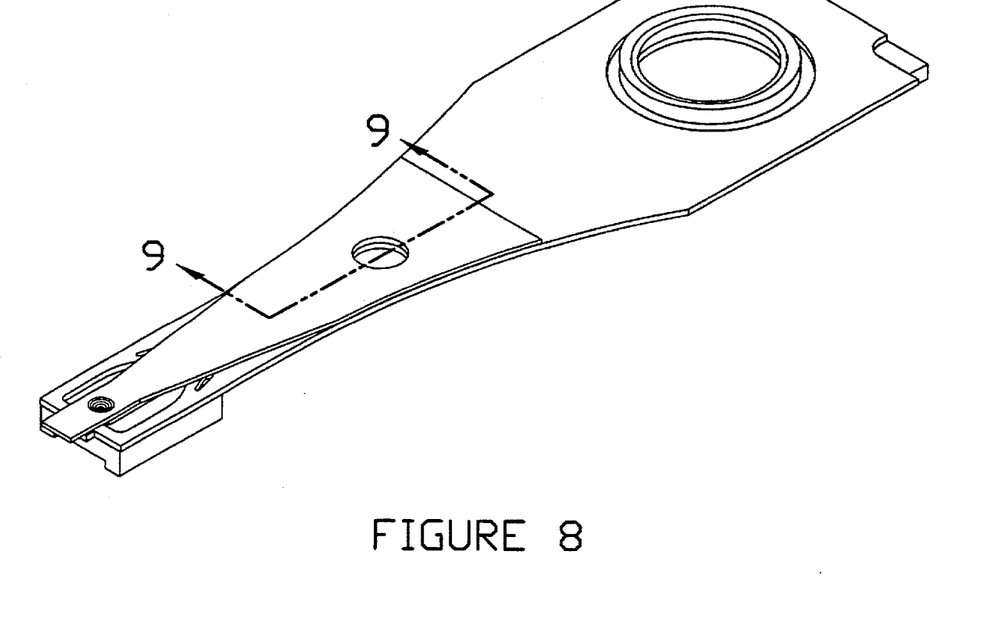
FIG. 8 is an isometric view of the assembled head suspension of FIG. 7.
Figure 9:
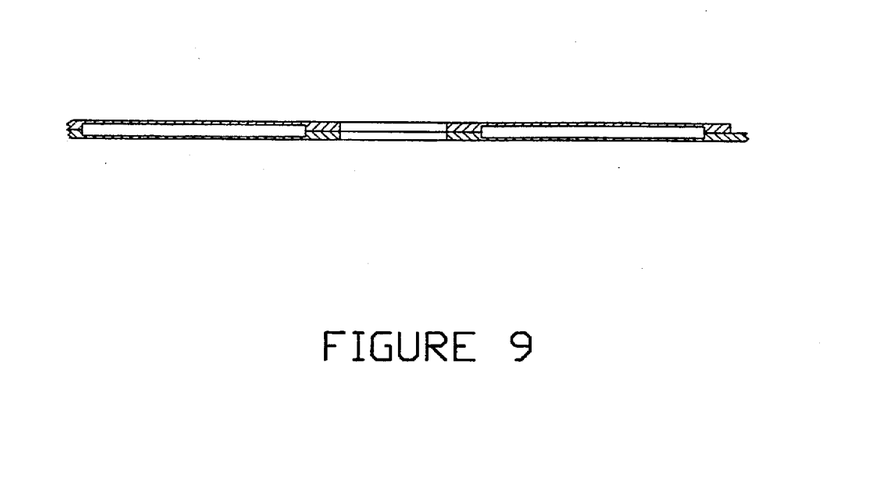
FIG. 9 is a partial cross-sectional view of the head suspension of FIG. 8 in a plane extending along the line 9—9 of FIG. 8.

The structural efficiency of this embodiment of the monocoque head suspension is dependent upon the thickness of the stiffener 112, the depth of the partial etched cavity 166, the shape of the stiffener, the shape of the partial etched cavity, the thickness of the load beam 104, and the method of stiffener attachment to the load beam. The example given uses a 0.025 mm inch thick load beam, a 0.075 mm thick stiffener, and a partial etched depth of 0.051 mm. These dimensions provide a total load beam thickness of only 0.1 mm and are well suited for very tight disk spacing requirements A still further embodiment of the head suspension is shown in FIGS. 7–9. This embodiment of the head suspension is substantially identical to that of FIGS. 4–6 and some of the same reference numerals used in describing the embodiment of FIGS. 4–6 are used in FIGS. 7–9 followed by a prime ('). The embodiment of FIGS. 7–9 differs from that of FIGS. 4–6 in that two cavities 166' are formed in the interior surface of the stiffener and two additional cavities 182, 184 are formed in the interior surface of the load beam 104' opposing the cavities 166' formed in the stiffener interior surface 158'. Also, both the load beam 104' lateral edges 134', 136' and the stiffener lateral edges 154', 156' curve as they extend longitudinally toward the load beam distal end 116' and stiffener distal end 148'. This embodiment illustrates a further method of forming the monocoque construction of the head suspension, and also illustrates the flexibility in manufacturing the monocoque construction of the head suspension The presently known methods of manufacturing monocoque load beams involve forming bends in the load beams and/or stiffeners to produce the spacing between the load beam and stiffener surfaces that forms the monocoque construction. The straight edges formed by the bends often have a tendency to reduce the torsional resonance of the head suspension. In constructing the monocoque head suspension of the invention according to the method of the invention, it is not necessary that the opposite lateral side edges of the head suspension be straight edges and the lateral edges may curve as shown in FIGS. 7-9. The monocoque head suspension of all of the embodiments of the invention have no limitations placed on their opposite lateral edges and it is possible to provide the opposite lateral edges with their optimal curved configurations including compound curves and edges with both curved and linear portions. In addition, prior art monocoque constructions formed from bent stiffeners require welding outside their formed edges. This requires extra material (and its associated mass) to be located at the opposite lateral sides of the monocoque region of prior art head suspensions at an increased distance from the longitudinal axis of the load beam. This extra material and its mass adds very little additional torsional stiffness to the head suspension because it must be formed flat for welding, but contributes significantly to the longitudinal polar moment of inertia of a head suspension. These effects combine to lower the torsional resonance of the prior art formed monocoque head suspension. The partial etched monocoque head suspension of the invention has the advantage of allowing welding locations anywhere on the flexure or stiffener including leaving a projection of unetched material within the etched cavities formed in the load beam or stiffener at their longitudinal axes to position the welds on these axes. Because this amount of added mass of the projections is the minimum required for welding, the effect on the torsional resonance and shock of a head suspension is minimized.

Each of the described embodiments of the invention provide a head suspension having increased stiffness over prior art head suspension of comparable mass. The monocoque construction also provides the advantages of higher shock and torsional resonance performance than currently available in prior art head suspension constructions. Its construction is more simplified, efficient and less expensive than many prior art manufacturing methods and the flat surfaces provided on the opposite sides of the head suspension facilitate the placement of electrical conductors communicating with the transducer heads supported by the assemblies.

While the present invention has been described by reference to a specific embodiment, it should be understood that modifications and variations of the invention may be constructed without departing from the scope of the invention defined in the following claims.

What is claimed is:

1. A method of manufacturing a head suspension for supporting a read/write head adjacent a data storage device, the method of manufacturing comprising the steps of:

forming a load beam from a sheet of flat, resilient material with the load beam having a longitudinal length with opposite proximal and distal ends and opposite first and second surfaces;

forming a lamina from a sheet of flat, resilient material with the lamina having a longitudinal length with opposite proximal and distal ends and opposite first and second surfaces;

forming a cavity into the first surface of one of the load beam and lamina with the cavity extending into the one of the load beam and lamina a distance that is less than a thickness of the one of the load beam and lamina into which the cavity is formed;

attaching the load beam first surface to the lamina first surface enclosing the cavity and thereby giving the head suspension a monocoque construction with a hollow interior volume inside the head suspension.

2. The method of claim 1, further comprising:

forming the load beam with opposite lateral edges having at least portions that curve as they extend longitudinally along the length of the load beam.

3. The method of claim 2, further comprising:

forming the lamina with opposite lateral edges having at least portions that curve as they extend longitudinally along the length of the lamina; and positioning the lamina relative to the load beam when the lamina is attached to the load beam so that the curved portions of the load beam lateral edges coincide with the curved portions of the lamina lateral edges.

4. The method of claim 1, further comprising:

forming the cavity into the first surface of the load beam and providing a gimbal on the lamina adjacent the distal end of the lamina.

5. The method of claim 1, further comprising:

forming the cavity into the first surface of the load beam and providing a gimbal on the load beam adjacent the distal end of the load beam.

6. The method of claim 1, further comprising:

forming the cavity into the first surface of the lamina and providing a gimbal on the load beam adjacent the distal end of the load beam.

7. The method of claim 1, further comprising:

forming the cavity into the first surface of the load beam and forming a second like cavity into the first surface of the lamina, and positioning the cavity and the second cavity in mutually opposed relation when attaching the load beam first surface to the lamina first surface.

8. The method of claim 1, further comprising:

positioning a plurality of electrical conductors extending longitudinally between the first surfaces of the load beam and the lamina prior to attaching the load beam first surface to the lamina first surface.

9. The method of claim 1, further comprising:

providing a projection in the cavity when forming the cavity with the projection extending outwardly from the cavity to a plane of the projection that is coplanar with the first surface of the one of the load beam and lamina into which the cavity is formed, and attaching the plane of the projection to the first surface of the other of the load beam and lamina when attaching the load beam first surface to the lamina first surface.

* * * * *